(12) United States Patent
Laoun

(10) Patent No.: US 6,509,663 B2
(45) Date of Patent: Jan. 21, 2003

(54) STEPPING MOTOR

(75) Inventor: Magdi Laoun, La Chaux-de-Fonds (CH)

(73) Assignee: API Portescap, La Chaux-de-Fonds (CH)

(*) Notice: Subject to any disclaimer, the term of this patent is extended or adjusted under 35 U.S.C. 154(b) by 0 days.

(21) Appl. No.: 09/847,714

(22) Filed: May 2, 2001

(65) Prior Publication Data

US 2001/0043021 A1 Nov. 22, 2001

(30) Foreign Application Priority Data

May 19, 2000 (CH) .............................................. 1012/00

(51) Int. Cl.[7] .............................................. H02K 22/12
(52) U.S. Cl. ............................ 310/156.32; 310/156.34; 310/156.35; 310/268; 310/254
(58) Field of Search ......................... 310/156.32, 49 R, 310/268, 103, 90, 261, 254, 156.34, 156.35

(56) References Cited

U.S. PATENT DOCUMENTS

| | | | |
|---|---|---|---|
| 3,803,431 A | * | 4/1974 | Inaba et al. .................... 310/49 |
| 4,288,709 A | * | 9/1981 | Matthias et al. ........... 310/49 R |
| 4,330,727 A | | 5/1982 | Oudet |
| 4,714,853 A | | 12/1987 | Palmero et al. |
| 4,922,145 A | | 5/1990 | Shippelman |
| 5,844,338 A | | 12/1998 | Horski |
| 5,945,751 A | * | 8/1999 | Hans et al. ................ 310/67 R |

FOREIGN PATENT DOCUMENTS

| | | |
|---|---|---|
| JP | 05252713 | 9/1993 |
| JP | 07244922 | 9/1995 |

* cited by examiner

Primary Examiner—Nestor Ramirez
Assistant Examiner—Thanh Lam
(74) Attorney, Agent, or Firm—Clifford W. Browning; Woodard, Emhardt, Naughton, Moriarty & McNett

(57) ABSTRACT

A stepping motor comprises a stator (3) with at least two magnetic circuits and a rotor (2) that is rotatably mounted on the stator through a single ball bearing having four contact points. The rotor comprises a mutipolar magnet (5) essentially in the form of a disc having a central opening (6). One rotor portion (7) is fixed at one radially external portion of the magnet (5), while one radially internal portion of the magnet is arranged within the air gap of said magnetic circuits.

11 Claims, 4 Drawing Sheets

STEPPING MOTOR

BACKGROUND OF THE INVENTION

The present invention relates to a stepping motor, and particularly a stepping motor with a disc-shaped multipolar magnet.

A motor of this type is described in the American patent U.S. 4,330,727. The motor according to this patent comprises a rotor having a traversing motor axis and a disc-shaped, multipolar magnet fixed on the axis by intermediate retainers. The rotor is mounted into a stator and supported by two bearings, one on each side of the disc magnet, in the form of ball bearings. This motor has two phases and comprises two coils surrounding magnetic circuit elements in each stator half. The magnetic circuits have air gaps within which the rotor magnet is positioned.

In a motor of this type, the drive organ for the object to be displaced is fixed on the motor axis outside the housing. In certain applications, the overall dimensions of such an assembly relative to the torque delivered and the number of steps per revolution are unsatisfactory. On the other hand, one always seeks to reduce the manufacturing costs, improve the precision, enhance the performance, and in particular, to increase the speed and the torque.

SUMMARY OF THE INVENTION

It is an object of this invention to realise a stepping motor that is compact, precise, and efficient. It is advantageous for certain applications to have a motor that is short in the direction of the axis of rotation. It is also advantageous to reduce the manufacturing costs of stepping motors.

The objects of this invention are achieved by a stepping motor according to claim 1.

In the present invention, a stepping motor comprises a stator with at least two magnetic circuits and a rotor that is rotatably mounted on a stator via bearings, the rotor comprising an organ equipped with magnets or a multipolar magnet essentially disc-shaped that is mounted on a portion of the rotor, said portion of the rotor being fixed to a radially external portion of the magnet and a radially internal portion of the magnet being arranged within the air gap of said magnetic circuits.

The portion of the rotor can have a central opening through which a portion of the stator extends.

The design according to the invention advantageously allows a particularly compact stepping motor to be realised.

The rotor portion can be in the shape of an essentially flat ring. The rotor portion can further comprise teeth arranged on its periphery in order to engage complementary teeth or holes of an object or organ to be displaced.

The rotor portion and/or magnet can be fixed on a mobile ring of the bearing, preferably the external ring of the bearing, the bearing preferably being a ball bearing. The ball bearing can be a bearing withstanding axial and radial stresses. The internal ring of the bearing can be mounted on a cylindrical surface of a portion of the stator. The internal ring of the bearing can be shorter than the external ring of the bearing against which the rotor portion is set, in order to reduce the length of the motor in the direction along its axis of rotation.

The design according to the invention allows a motor with a single bearing to be realised, notably a ball bearing with four contact points and large diameter, which results in an extremely compact yet highly rigid design. Moreover, the motor consists of a small number of pieces, so that its manufacture is economical.

The stator may comprise a first stator portion on which the coils are mounted, and a second stator portion in the form of yokes set against this first portion so as to close the magnetic circuits which comprise an air gap between the radially outer portions of the first stator portion and the yokes, respectively. There is one yoke for each motor phase, so that the magnetic circuits of the different phases are separate. Each magnetic circuit can thus comprise a coil and a yoke.

For a two-phase motor, two coils and two yokes are symmetrically arranged on either side of a line of symmetry passing through the center of rotation of the motor. The radially outer portions of the yokes and of the first stator portion can be fitted with teeth or other extension shapes facing each other to form stator pole pairs attracting the opposite pole pairs of the magnet when the coil of the corresponding magnetic circuit is supplied with electric current. The pole pairs of the magnet move into a position facing the stator pole pairs, whereupon the other coil is supplied so as to attract magnet pole pairs, and so on, to make the rotor move forward. The teeth or extensions of each yoke portion are symmetrically arranged with respect to the line of symmetry but are not diametrically symmetric, since the teeth, as in the conventional stepping motors, move forward by angles in such a way that the magnet poles facing extensions or teeth of one magnetic circuit do not face teeth or extensions of the other magnetic circuit.

It should be noted that the motor according to the invention can have more than two phases without leaving the scope of the invention. For example, the motor can have several magnetic circuits taking up motor sectors of generally cylindrical shape, a sector having an angle of essentially 120° for a three-phase motor and an angle of 90° for a four-phase motor.

The first stator portion on which the coils are mounted can be made of a sintered material having a good magnetic permeability but poor electrical conductivity, so as to limit eddy current losses in a compact, low-cost design.

Other aims and advantageous aspects of the invention will become apparent from the claims, the description, and the annexed drawings.

DETAILED DESCRIPTION OF THE INVENTION

Figure 1:
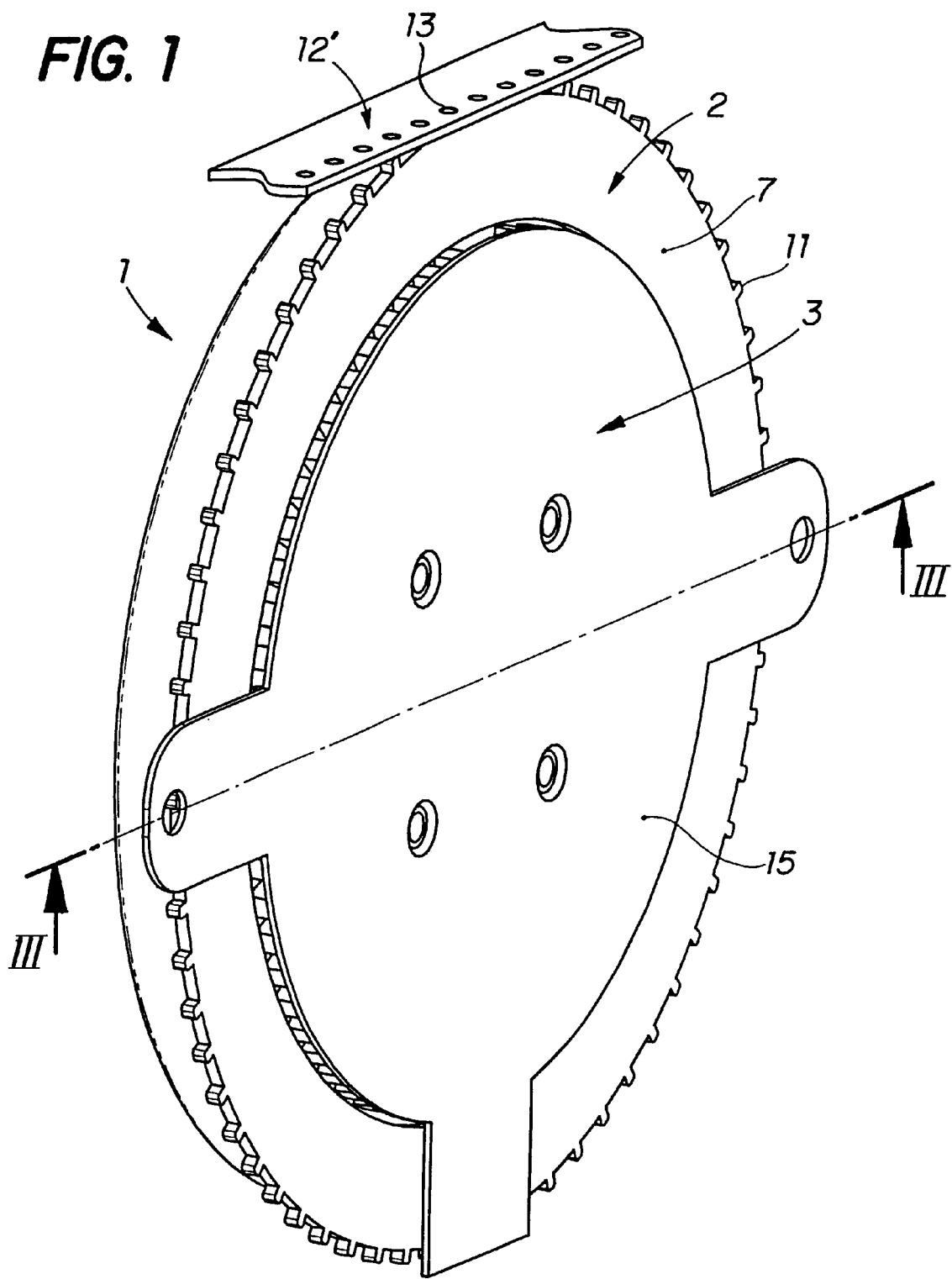
FIG. 1 is a perspective view of an embodiment of a stepping motor according to the invention.
Figure 2:
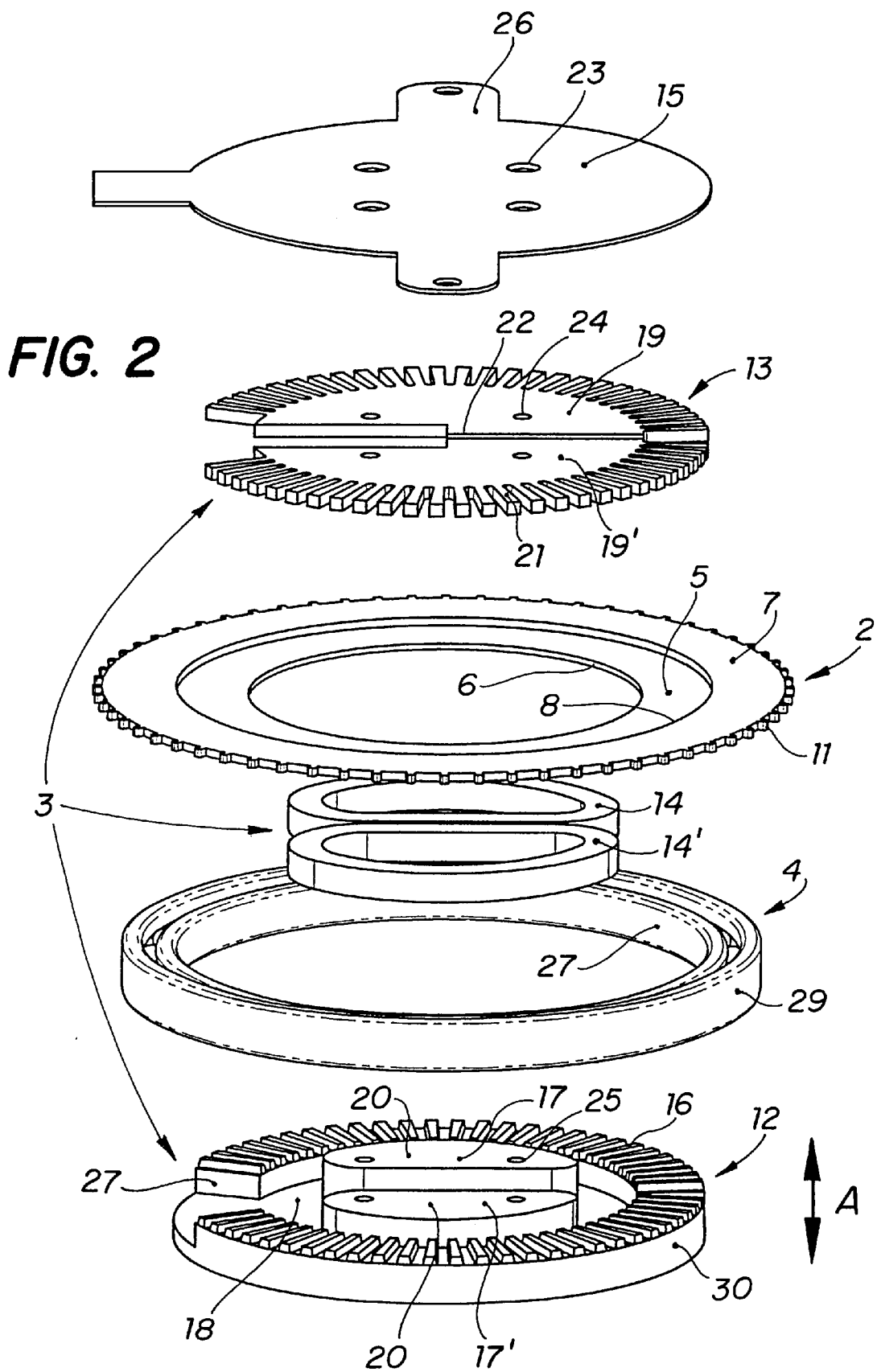
FIG. 2 is an exploded perspective view of the motor according to FIG. 1.
Figure 3:
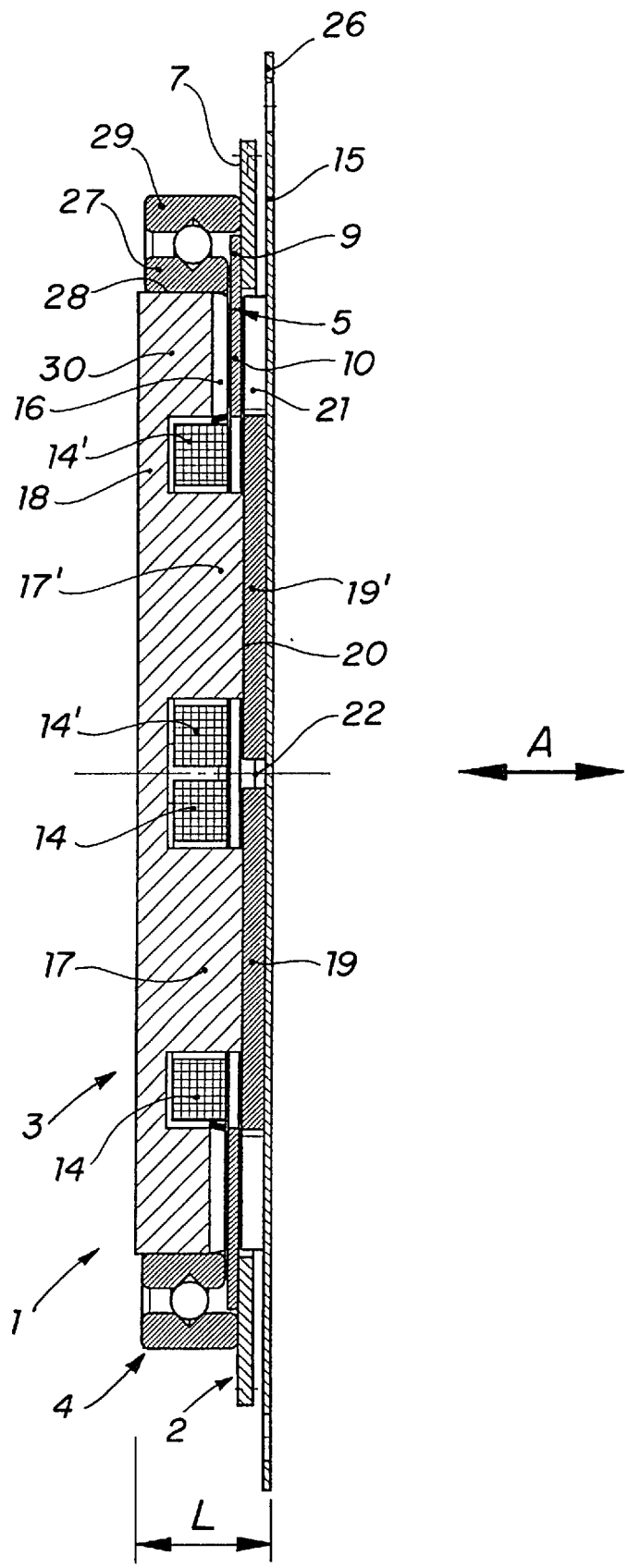
FIG. 3 is a section along the line III—III of FIG. 1.

Referring to FIGS. 1 to 3, a stepping motor 1 comprises a rotor 2, a stator 3 and a bearing 4 for rotatable mounting of the rotor 2 on the stator 3. The rotor 2 comprises a permanent multipolar magnet 5 in the shape of a ring or a disc having a central opening 6. The rotor moreover comprises a rotor portion 7 in the shape of a ring or disc having a central opening 8, this portion being fixed to the magnet 5, and more particularly to a radially external portion 9 of the magnet. A radially internal portion 10 of the magnet that extends between the central opening 6 of the magnet and the central opening 8 of the rotor portion 7 is equipped with a plurality of magnetic pole pairs arranged on the magnet's contour, for instance in the shape of ring segments where adjacent pole pairs have opposite magnetic fields. The rotor moreover is provided with teeth 11 on its periphery in order to engage and drive an organ or object 12' to be displaced, which in the example shown is a ribbon having perforations 13. This design thus permits to directly transform the rotor's rotation into a translational movement of a ribbon or other drive organ 12'.

It is possible to make the rotor 2 as a single part, the permanent magnet and the external rotor portion consisting of a single part made of a permanent magnetic material.

Other designs are also possible, for instance one can fix a plurality of magnets on the inner periphery of the rotor portion 7 instead of using a multipolar magnet.

The stator 3 comprises a first stator portion 12, a second stator portion 13, coils 14, 14' and a flange 15.

The first stator portion 12 comprises on its periphery a plurality of teeth or protuberances 16 which extend in the axial direction A (the direction of the motor's axis of rotation) as well as core portions 17, 17' around which the corresponding electrical coils 14, 14' are mounted. The protuberances 16 and the core portions 17, 17' are rigidly connected by a disc-shaped base 18.

The second stator portion 13 comprises two yokes 19, 19', one for each coil and thus for each motor phase, the yokes being set against the free surfaces 20 of the core portions 17, 17', and these surfaces being essentially orthogonal to the axis A. The yokes 19, 19' are provided with protuberances or extensions 21 on their peripheries, in such a way that they face the protuberances 16 of the first stator portion when the portions are assembled. The gap between the protuberances or extensions 21, 16 of the second and first stator portion constitutes the air gap of the corresponding magnetic circuits, each formed by one of the yokes, one of the core portions 17, 17' and the base 18. The yokes 19, 19' are separated by a slot 22 in order to separate the magnetic circuits of the two phases.

The first stator portion 12 and/or the second stator portion 13 can be made of a sintered material having a good magnetic permeability but poor electrical conductivity, so as to reduce the losses due to eddy currents. One thus can avoid a laminated design of the magnetic circuit, notably in order to reduce the manufacturing costs, but can still obtain three-dimensional shapes, for instance teeth and the core, that are compact and rigid. The yokes 19 have the form of a disc relatively thin as compared to the first stator part, and can likewise consist of a sintered material, or simply of a plate of (nonsintered) material having a good magnetic permeability.

The flange 15 can be set against the second stator portion 13, and comprise holes 23 aligned with holes 24, 25 of the second and first stator portion, the holes 25 of the first portion being for instance threaded for component assembly. The flange can be provided with different elements such as fastening strips 26, so that the motor can be mounted on a support.

The stator comprises a passage 27 traversing the external ring 30 of the base 18 for housing a connector and/or a small printed-circuit card linking the conducting wires of the coils to an external electronic or electric circuit.

Figure 4:
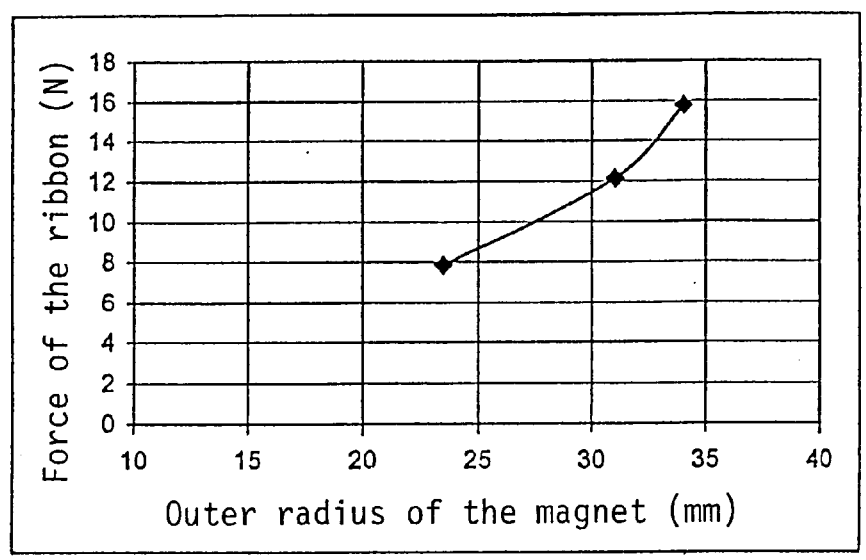
FIG. 4 is a graph showing the relation between the tangential force at the rotor periphery and the outer radius of the magnet.
Figure 5:
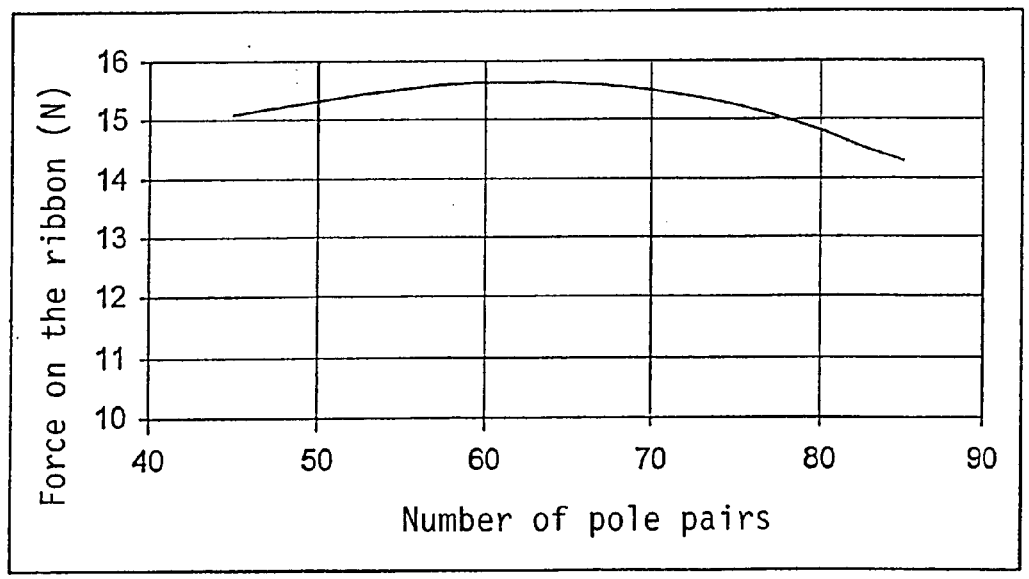
FIG. 5 is a graph showing the relation between the tangential force at the rotor periphery and the number of pole pairs.

It should be noted that the two yokes 19 are symmetrically arranged to both sides of a line of symmetry that passes through the motor's center of rotation, but the extensions or protuberances are angularly offset so that the teeth of one yoke are not diametrically opposite to those of the other yoke. This angular offset is a feature of known stepping motors and will thus not be described in greater detail. The angular spacing of the teeth is $2\pi/64$ radians, in this particular case, which corresponds to 256 steps per revolution, since there are four steps per stator pole pair in a two-phase motor. In a particular example, the motor comprises a rotor having an external diameter of 81.5 mm and is equipped with 64 teeth, so that there is a spacing of 4 mm between the teeth. The motor allows the ribbon 12' to be displaced in 20 ms with a force of about 15 newtons and a precision of the order of 15 $\mu$m. In such an example the motor's length L is about 10 mm. By choosing 64 pairs of stator poles one can optimise the tangential force (the force acting on ribbon 12') as illustrated in the curve of force as a function of the number of pole pairs in FIG. 5. The relatively large diameter of the magnet, and notably its disposition around the coils, allows a design to be realised that is very compact yet delivers a high torque, as can be seen by reference to FIG. 4 where the tangential force (force acting on ribbon 12') is proportional to the outer radius of the magnet.

In this embodiment, the bearing 4 is a ball bearing having four contact points taking up the radial and axial force components. The inherent rigidity of such a bearing improves as its diameter increases. The present invention takes advantage of this feature by arranging the bearing 4 around stator 3. This design makes it possible amongst other points to equip the motor with a single bearing, hence to have a very small length L in the direction of axis A while retaining a high rigidity and precision. The internal ring 27 is mounted on the cylindrical outer surface 28 of the first stator portion 12, while the external ring 29 of the bearing 4 is set against the rotor portion 7. The internal ring 27 has a smaller length than the external ring 29 in the direction of axis A in order to allow the radially external portion 9 of the magnet to be arranged facing a radially internal portion of the rotor portion 7.

What is claimed is:

1. Stepping motor comprising a stator with at least two magnetic circuits and a rotor mounted rotatably on the stator via a bearing, the rotor comprising a rotor portion mounted to said bearing and an organ having magnets, or a multipolar magnet, essentially in the shape of a disc with a central opening and mounted on said rotor portion, characterized in that said rotor portion is fixed to a radially external portion of the multipolar magnet or organ with magnets, a radially internal portion of the magnet or organ with magnets being arranged within an air gap of said magnetic circuits.

2. Motor according to claim 1, characterized in that said rotor portion (7) is provided with a central opening (8) through which a stator portion (3) extends.

3. Motor according to claim 1, characterized in that said rotor portion is essentially flat and comprises teeth (11) disposed on its periphery, said teeth projecting outside of said stepping motor.

4. Motor according to claim 1, characterized in that the rotor is fixed to a radially external ring (29) of the bearing while the stator is fixed to a radially internal ring (27) of the bearing.

5. Motor according to claim 1, characterized in that the bearing comprises a ball bearing with four contact points.

6. Motor according to claim 1, characterized in that the radially internal ring of the bearing is shorter than the radially external ring of the bearing in the direction (A) of the motor's axis of rotation.

7. Motor according to claim 1, characterized in that the stator comprises a first stator portion (12) with core portions (17, 17'), for mounting electrical coils (14, 14') whereby there is one core portion for each electrical coil (14, 14') of the magnetic circuit, a base (18), and a plurality of protuberances or extensions (16).

8. Motor according to claim 7, characterized in that in addition it comprises a second stator portion (13) in the form of yokes (19, 19'), one for each motor phase, which are set against the first stator portion as to form a magnetic circuit for each motor phase.

9. Motor according to claim 8, characterized in that the first stator portion is made of a single piece of sintered material having a good magnetic permeability.

10. Motor according to claim 7, characterized in that the second stator portion (13) has an essentially flat shape and comprises radial protuberances or extensions (21) on the periphery facing the extensions or protuberances of the first stator portion so as to form stator pole pairs.

11. Motor according to claim 1, characterized in that it comprises only one bearing.

* * * * *